W. F. Warburton.

Ventilating Hats.

No 1535 Reissued Sep. 8, 1863.

Witnesses.
Chas. Howson.
Edwards & Foster

Inventor.
Henry Howson
Atty for W. F. Warburton

UNITED STATES PATENT OFFICE.

WILLIAM F. WARBURTON, OF PHILADELPHIA, PENNSYLVANIA.

IMPROVEMENT IN VENTILATED HATS.

Specification forming part of Letters Patent No. 30,900, dated December 11, 1860; Reissue No. 1,535, dated September 8, 1863.

*To all whom it may concern:*

Be it known that I, W. F. WARBURTON, of Philadelphia, Pennsylvania, did obtain Letters Patent of the United States, bearing date the 11th day of December, A. D. 1860, for an Improvement in Ventilated Hats, which Letters Patent I now deem inoperative and invalid by reason of a defective and insufficient specification; and I do hereby declare the following to be a full, clear, and exact description of the said invention, reference being had to the accompanying drawings, and to the letters of reference marked thereon.

My invention consists of a flexible band or strip of metal or other equivalent material, secured to the inside of a hat at such a distance from the same and between such points that it will accommodate itself to the wearer's forehead without interfering with the passage of air between the said band and the inside of the hat.

In order to enable others skilled in the art to make and use my invention, I will now proceed to describe its construction and operation.

Figure 1:
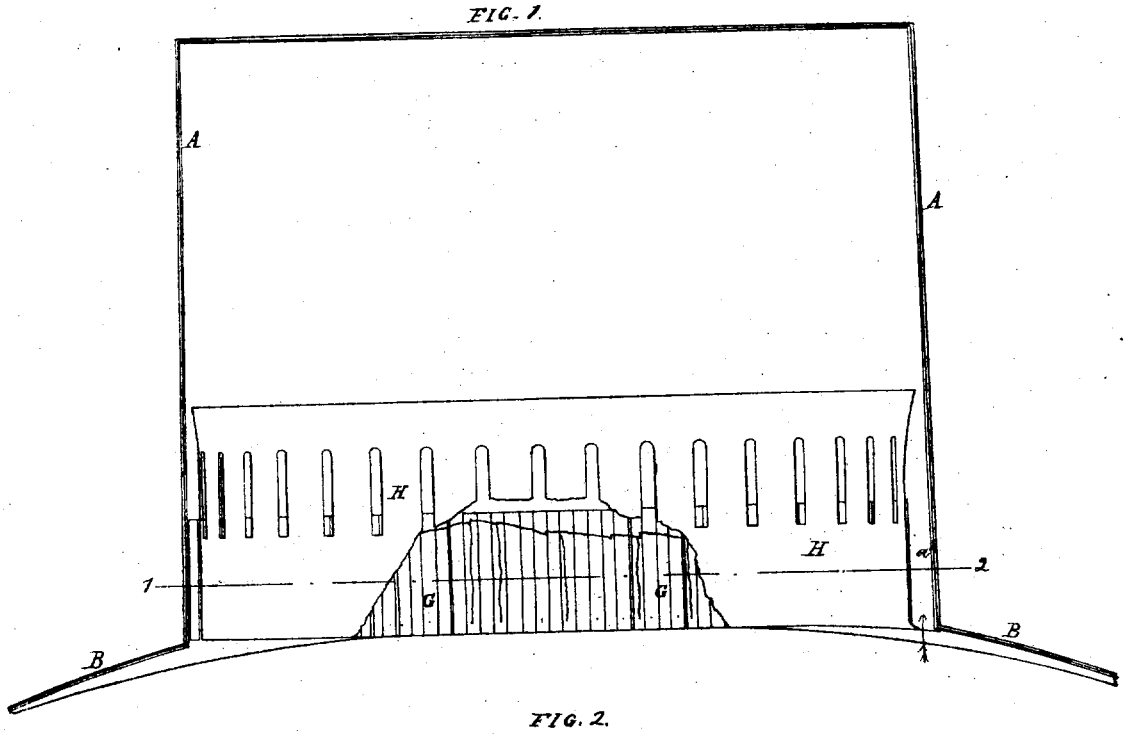
Figure 2:
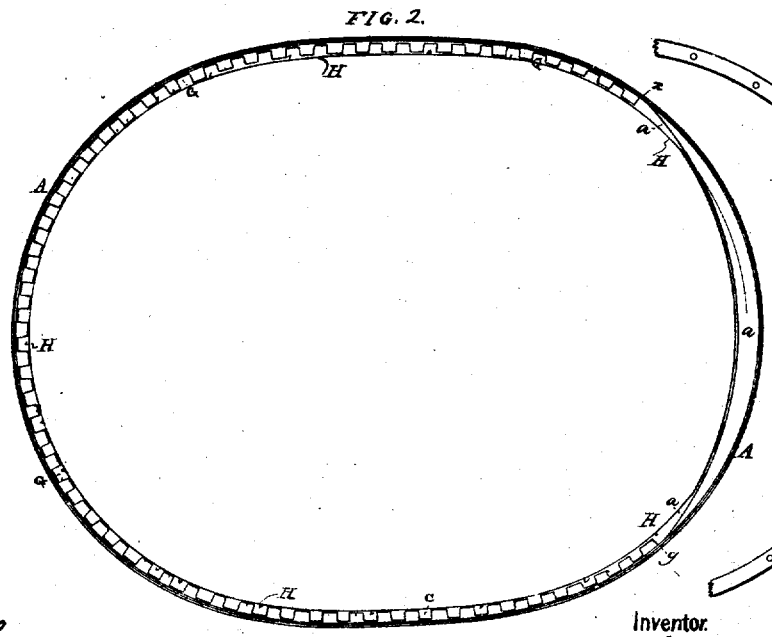
Figure 3:
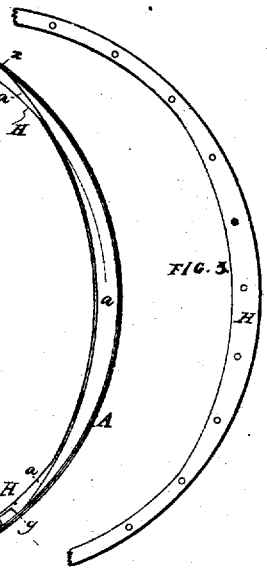

On reference to the accompanying drawings, which form part of this specification, Figure 1 is a vertical section of a hat with my improvement, a portion of the sweat-band being removed; Fig. 2, a sectional plan on the line 1 2; Fig. 1 and Fig. 3, a plan view of part of the hat, showing the perforated front of the sweat-band.

Similar letters refer to similar parts throughout the several views.

A is the body, and B the brim, of the hat, both being made in the usual manner, or in that described in the patent granted to me on the 2d day of August, 1859, the body being perforated both at the top and sides. A band, G, of thin metal or other flexible material, partly corrugated and partly plain, is stitched or otherwise secured to the interior of the hat, its lower edge coinciding, or thereabout with the lower edge of the body where the latter joins the brim. The corrugated portion of this band extends along the back and sides of the hat, the plain portion *a* extending from *x* to *y* in front, there being a space between this plain portion of the band and the inside of the hat of a width sufficient to prevent one coming in contact with the other.

H is the sweat-band, stitched to the corrugations of the band *g*, and folded down in front, so as to cover the space between the plain portion *a* of the band and the front of the hat. This portion of the sweat-band, however, is perforated with holes, so as to allow a free access of air to the above-mentioned space. As the plain portion of the band G is disconnected from the hat between the points *x* and *y*, and as it is made thin and flexible, it can accommodate itself to the shape of the wearer's forehead without interfering with the free passage of air between the band and the inside of the hat. Increased comfort, both as regard the fitting of the hat and its thorough ventilation, is thus afforded to the wearer by my improvement. The corrugated portion of the band G affords a free access of air to the interior of the hat at the sides and back of the same. This corrugated portion I prefer to secure to the hat by means of threads separate from and independent of the threads which secure the sweat-band to the corrugated band, thereby preventing that penetration of the perspiration from the interior to the exterior of the hat which takes place in hats having a corrugated band and sweat-band secured to the body of the hat by a continuous thread, which absorbs the perspiration and transmits it to and disfigures the exterior.

A flexible strip may be secured to the interior of the hat between the points *x* and *y*, independently of the corrugated band, with the same result as regard easy fitting to the forehead and a thorough ventilation of the front portion of the hat.

Disclaiming the employment of corrugated bands or strips between the wearer's head and the hat for ventilating purposes, I claim as my invention and desire to secure by Letters Patent—

A flexible band or strip of metal or other equivalent material, secured to the inside of a hat at such a distance from the same and between such points that it will accommodate itself to the wearer's forehead without interfering with the passage of air between the said band and the hat, as set forth.

In testimony whereof I have signed my name to this specification before two subscribing witnesses.

WM. F. WARBURTON.

Witnesses:

HENRY HOWSON,

JAMES MCCUHEN.